US009159331B2

(12) United States Patent
Kim et al.

(10) Patent No.: US 9,159,331 B2
(45) Date of Patent: Oct. 13, 2015

(54) BIT ALLOCATING, AUDIO ENCODING AND DECODING

(75) Inventors: Mi-young Kim, Hwaseong-si (KR); Anton Porov, St. Petersburg (RU); Eun-mi Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 13/471,046

(22) Filed: May 14, 2012

(65) Prior Publication Data

US 2012/0290307 A1 Nov. 15, 2012

Related U.S. Application Data

(60) Provisional application No. 61/495,014, filed on Jun. 9, 2011, provisional application No. 61/485,741, filed on May 13, 2011.

(51) Int. Cl.
*H04B 1/66* (2006.01)
*G10L 19/02* (2013.01)
*G10L 19/00* (2013.01)
(Continued)

(52) U.S. Cl.
CPC ............. *G10L 19/028* (2013.01); *G10L 19/032* (2013.01)

(58) Field of Classification Search
CPC ....... G10L 19/008; G10L 19/00; G10L 19/02; G10L 19/167; G10L 19/005; G10L 19/20; G10L 19/0212; G10L 19/035; G10L 19/18; G10L 19/002; G10L 19/0204; G10L 19/24; G10L 19/032; G10L 19/025; G10L 19/0208; G10L 19/038; G10L 19/06; G10L 19/07; G10L 2019/0005; G10L 21/04; G11B 2020/10546; G11B 2020/00028; H04M 3/568; H04S 2420/03; H04S 3/008; H04S 1/007; G06T 9/008; H03M 3/042; H03M 7/30; H03M 7/3082; H04N 21/4394
USPC .................................. 704/229, 230, 500–504
See application file for complete search history.

(56) References Cited

U.S. PATENT DOCUMENTS 5,079,547 A * 1/1992 Fuchigama et al. ............ 341/51
5,471,558 A 11/1995 Tsutsui
(Continued)

FOREIGN PATENT DOCUMENTS

JP 05-91061 A 4/1993
JP 05-114863 A 5/1993
(Continued)

OTHER PUBLICATIONS

Minjie Xie; Chu, P.; Taleb, A; Briand, M., "ITU-T G.719: A new low-complexity full-band (20 kHZ) audio coding standard for high-quality conversational applications," Applications of Signal Processing to Audio and Acoustics, 2009. WASPAA '09. IEEE Workshop on , vol., No., pp. 265,268, Oct. 18-21, 2009.*
(Continued)

*Primary Examiner* — Edgar Guerra-Erazo
(74) *Attorney, Agent, or Firm* — Sughrue Mion, PLLC

(57) ABSTRACT

A bit allocating method is provided that includes determining the allocated number of bits in decimal point units based on each frequency band so that a Signal-to-Noise Ratio (SNR) of a spectrum existing in a predetermined frequency band is maximized within a range of the allowable number of bits for a given frame; and adjusting the allocated number of bits based on each frequency band.

21 Claims, 12 Drawing Sheets

(51) Int. Cl.

| | |
|---|---|
| ***G10L 21/04*** | (2013.01) |
| ***G10L 19/028*** | (2013.01) |
| ***G10L 19/032*** | (2013.01) |

(56) References Cited

U.S. PATENT DOCUMENTS

| | | | | |
|---|---|---|---|---|
| 5,583,967 | A * | 12/1996 | Akagiri | 704/200.1 |
| 5,627,938 | A * | 5/1997 | Johnston | 704/200.1 |
| 5,721,806 | A * | 2/1998 | Lee | 704/229 |
| 5,864,802 | A * | 1/1999 | Kim et al. | 704/230 |
| 5,930,750 | A | 7/1999 | Tsutsui | |
| 5,956,674 | A * | 9/1999 | Smyth et al. | 704/200.1 |
| 6,098,039 | A * | 8/2000 | Nishida | 704/229 |
| 6,308,150 | B1 * | 10/2001 | Neo et al. | 704/200.1 |
| 6,792,402 | B1 * | 9/2004 | Chen | 704/200.1 |
| 7,272,566 | B2 * | 9/2007 | Vinton | 704/500 |
| 7,873,510 | B2 * | 1/2011 | Kurniawati et al. | 704/200.1 |
| 2001/0053973 | A1 * | 12/2001 | Tsuzuki | 704/229 |
| 2002/0004718 | A1 * | 1/2002 | Hasegawa et al. | 704/229 |
| 2003/0233234 | A1 | 12/2003 | Truman et al. | |
| 2006/0069555 | A1 * | 3/2006 | Konda et al. | 704/229 |
| 2007/0016414 | A1 * | 1/2007 | Mehrotra et al. | 704/230 |
| 2007/0185711 | A1 * | 8/2007 | Jang et al. | 704/226 |
| 2007/0244699 | A1 * | 10/2007 | Mogi et al. | 704/229 |
| 2010/0114585 | A1 | 5/2010 | Yoon et al. | |
| 2010/0198587 | A1 | 8/2010 | Ramabadran et al. | |
| 2010/0241437 | A1 | 9/2010 | Taleb et al. | |
| 2011/0035212 | A1 | 2/2011 | Briand et al. | |
| 2012/0288117 | A1 * | 11/2012 | Kim et al. | 381/94.2 |
| 2013/0346087 | A1 * | 12/2013 | Grancharov et al. | 704/500 |

FOREIGN PATENT DOCUMENTS

| | | | |
|---|---|---|---|
| JP | 9214355 | A | 8/1997 |
| JP | 2005265865 | A | 9/2005 |

OTHER PUBLICATIONS

Jing Wang; Ning Ning; Ji, Xuan; Jingming Kuang, "Perceptual Norm Adjustment with Segmental Weighted SMR for ITU-T G.719 Audio Codec," Multimedia and Signal Processing (CMSP), 2011 International Conference on , vol. 2, No., pp. 282,285, May 14-15, 2011.*

"Low-complexity, full-band audio coding for high-quality, conversational applications," Series G: Transmission Systems and Media, Digital Systems and Networks, Digital terminal equipments—Coding of analogue signals, ITU-T, G.719, Jun. 2008, 58 pages.

International Search Report (PCT/ISA/220 & PCT/ISA/210) dated Nov. 30, 2012 in counterpart application No. PCT/KR2012003776.

Written Opinion (PCT/ISA/237) dated Nov. 30, 2012 in counterpart application No. PCT/KR2012003776.

International Search Report (PCT/ISA/220 & PCT/ISA/210) dated Nov. 30, 2012 in counterpart application No. PCT/KR/2012/003777.

Written Opinion (PCT/ISA/237) dated Nov. 30, 2012 in counterpart application No. PCT/KR/2012/003777.

Voran, Stephen, "Perception-Based Bit-Allocation Algorithms for Audio Coding", Applications of Signal Processing to Audio and Acoustics, Oct. 19, 1997, IEEE ASSP Workshop on New Peitz, NY, 4 pages.

Communication, Issued by the European Patent Office, Dated Oct. 30, 2014, in counterpart European Application No. 12785222.6.

* cited by examiner

BIT ALLOCATING, AUDIO ENCODING AND DECODING

CROSS-REFERENCE TO RELATED PATENT APPLICATION

This application claims the benefits of U.S. Provisional Application No. 61/485,741, filed on May 13, 2011, and U.S. Provisional Application No. 61/495,014, filed on Jun. 9, 2011, in the U.S. Patent Trademark Office, the disclosures of which are incorporated by reference herein in their entirety.

BACKGROUND

1. Field

Apparatuses, devices, and articles of manufacture consistent with the present disclosure relate to audio encoding and decoding, and more particularly, to a method and apparatus for efficiently allocating bits to a perceptively important frequency area based on sub-bands, an audio encoding method and apparatus, an audio decoding method and apparatus, a recording medium and a multimedia device employing the same.

2. Description of the Related Art

When an audio signal is encoded or decoded, it is required to efficiently use a limited number of bits to restore an audio signal having the best sound quality in a range of the limited number of bits. In particular, at a low bit rate, a technique of encoding and decoding an audio signal is required to evenly allocate bits to perceptively important spectral components instead of concentrating the bits to a specific frequency area.

In particular, at a low bit rate, when encoding is performed with bits allocated to each frequency band such as a sub-band, a spectral hole may be generated due to a frequency component, which is not encoded because of an insufficient number of bits, thereby resulting in a decrease in sound quality.

SUMMARY

It is an aspect to provide a method and apparatus for efficiently allocating bits to a perceptively important frequency area based on sub-bands, an audio encoding method and apparatus, an audio decoding method and apparatus, a recording medium and a multimedia device employing the same.

It is an aspect to provide a method and apparatus for efficiently allocating bits to a perceptively important frequency area with a low complexity based on sub-bands, an audio encoding method and apparatus, an audio decoding method and apparatus, a recording medium and a multimedia device employing the same.

According to an aspect of one or more exemplary embodiments, there is provided a bit allocating method comprising: determining the allocated number of bits in decimal point units based on each frequency band so that a Signal-to-Noise Ratio (SNR) of a spectrum existing in a predetermined frequency band is maximized within a range of the allowable number of bits for a given frame; and adjusting the allocated number of bits based on each frequency band.

According to another aspect of one or more exemplary embodiments, there is provided a bit allocating apparatus comprising: a transform unit that transforms an audio signal in a time domain to an audio spectrum in a frequency domain; and a bit allocating unit that estimates the allowable number of bits in decimal point units by using a masking threshold based on frequency bands included in a given frame in the audio spectrum, estimates the allocated number of bits in decimal point units by using spectral energy, and adjusts the allocated number of bits not to exceed the allowable number of bits.

According to another aspect of one or more exemplary embodiments, there is provided an audio encoding apparatus comprising: a transform unit that transforms an audio signal in a time domain to an audio spectrum in a frequency domain; a bit allocating unit that determines the allocated number of bits in decimal point units based on each frequency band so that a Signal-to-Noise Ratio (SNR) of a spectrum existing in a predetermined frequency band is maximized within a range of the allowable number of bits for a given frame of the audio spectrum and adjusts the allocated number of bits determined based on each frequency band; and an encoding unit that encodes the audio spectrum by using the number of bits adjusted based on each frequency band and spectral energy.

According to another aspect of one or more exemplary embodiments, there is provided an audio decoding apparatus comprising: a transform unit that transforms an audio signal in a time domain to an audio spectrum in a frequency domain; a bit allocating unit that determines the allocated number of bits in decimal point units based on each frequency band so that a Signal-to-Noise Ratio (SNR) of a spectrum existing in a predetermined frequency band is maximized within a range of the allowable number of bits for a given frame of the audio spectrum and adjusts the allocated number of bits determined based on each frequency band; and an encoding unit that encodes the audio spectrum by using the number of bits adjusted based on each frequency band and spectral energy.

According to another aspect of one or more exemplary embodiments, there is provided an audio decoding apparatus comprising: a bit allocating unit that estimates the allowable number of bits in decimal point units by using a masking threshold based on frequency bands included in a given frame, estimates the allocated number of bits in decimal point units by using spectral energy, and adjusts the allocated number of bits not to exceed the allowable number of bits; a decoding unit that decodes an audio spectrum included in a bitstream by using the number of bits adjusted based on each frequency band and spectral energy; and an inverse transform unit that transforms the decoded audio spectrum to an audio signal in a time domain.

BRIEF DESCRIPTION OF THE DRAWINGS

The above and other aspects will become more apparent by describing in detail exemplary embodiments thereof with reference to the attached drawings in which.

DETAILED DESCRIPTION

Figure 1:
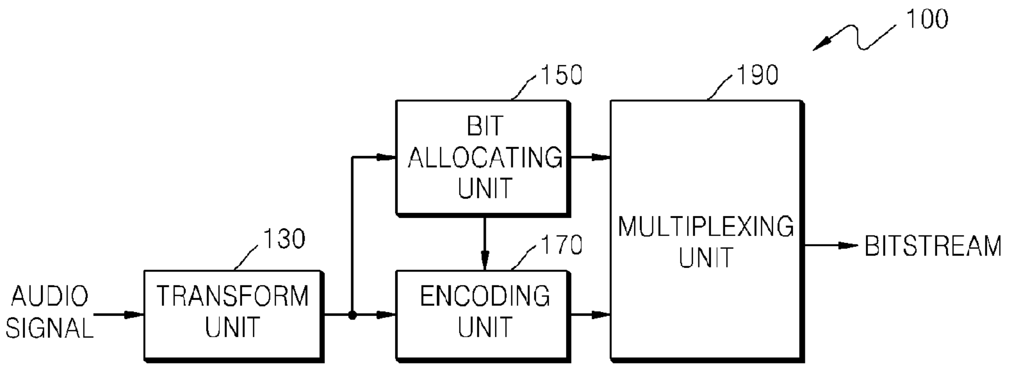
FIG. 1 is a block diagram of an audio encoding apparatus according to an exemplary embodiment.

The present inventive concept may allow various kinds of change or modification and various changes in form, and specific exemplary embodiments will be illustrated in drawings and described in detail in the specification. However, it should be understood that the specific exemplary embodiments do not limit the present inventive concept to a specific disclosing form but include every modified, equivalent, or replaced one within the spirit and technical scope of the present inventive concept. In the following description, well-known functions or constructions are not described in detail since they would obscure the invention with unnecessary detail.

Although terms, such as 'first' and 'second', can be used to describe various elements, the elements cannot be limited by the terms. The terms can be used to classify a certain element from another element.

The terminology used in the application is used only to describe specific exemplary embodiments and does not have any intention to limit the present inventive concept. Although general terms as currently widely used as possible are selected as the terms used in the present inventive concept while taking functions in the present inventive concept into account, they may vary according to an intention of those of ordinary skill in the art, judicial precedents, or the appearance of new technology. In addition, in specific cases, terms intentionally selected by the applicant may be used, and in this case, the meaning of the terms will be disclosed in corresponding description of the invention. Accordingly, the terms used in the present inventive concept should be defined not by simple names of the terms but by the meaning of the terms and the content over the present inventive concept.

An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

Hereinafter, the present inventive concept will be described more fully with reference to the accompanying drawings, in which exemplary embodiments are shown. Like reference numerals in the drawings denote like elements, and thus their repetitive description will be omitted.

As used herein, expressions such as "at least one of," when preceding a list of elements, modify the entire list of elements and do not modify the individual elements of the list.

FIG. 1 is a block diagram of an audio encoding apparatus 100 according to an exemplary embodiment.

The audio encoding apparatus 100 of FIG. 1 may include a transform unit 130, a bit allocating unit 150, an encoding unit 170, and a multiplexing unit 190. The components of the audio encoding apparatus 100 may be integrated in at least one module and implemented by at least one processor (e.g., a central processing unit (CPU)). Here, audio may indicate an audio signal, a voice signal, or a signal obtained by synthesizing them, but hereinafter, audio generally indicates an audio signal for convenience of description.

Referring to FIG. 1, the transform unit 130 may generate an audio spectrum by transforming an audio signal in a time domain to an audio signal in a frequency domain. The time-domain to frequency-domain transform may be performed by using various well-known methods such as Discrete Cosine Transform (DCT).

The bit allocating unit 150 may determine a masking threshold obtained by using spectral energy or a psych-acoustic model with respect to the audio spectrum and the number of bits allocated based on each sub-band by using the spectral energy. Here, a sub-band is a unit of grouping samples of the audio spectrum and may have a uniform or non-uniform length by reflecting a threshold band. When sub-bands have non-uniform lengths, the sub-bands may be determined so that the number of samples from a starting sample to a last sample included in each sub-band gradually increases per frame. Here, the number of sub-bands or the number of samples included in each sub-frame may be previously determined. Alternatively, after one frame is divided into a predetermined number of sub-bands having a uniform length, the uniform length may be adjusted according to a distribution of spectral coefficients. The distribution of spectral coefficients may be determined using a spectral flatness measure, a difference between a maximum value and a minimum value, or a differential value of the maximum value.

According to an exemplary embodiment, the bit allocating unit 150 may estimate an allowable number of bits by using a Norm value obtained based on each sub-band, i.e., average spectral energy, allocate bits based on the average spectral energy, and limit the allocated number of bits not to exceed the allowable number of bits.

According to an exemplary embodiment of, the bit allocating unit 150 may estimate an allowable number of bits by using a psycho-acoustic model based on each sub-band, allocate bits based on average spectral energy, and limit the allocated number of bits not to exceed the allowable number of bits.

The encoding unit 170 may generate information regarding an encoded spectrum by quantizing and lossless encoding the audio spectrum based on the allocated number of bits finally determined based on each sub-band.

The multiplexing unit 190 generates a bitstream by multiplexing the encoded Norm value provided from the bit allocating unit 150 and the information regarding the encoded spectrum provided from the encoding unit 170.

Figure 7:
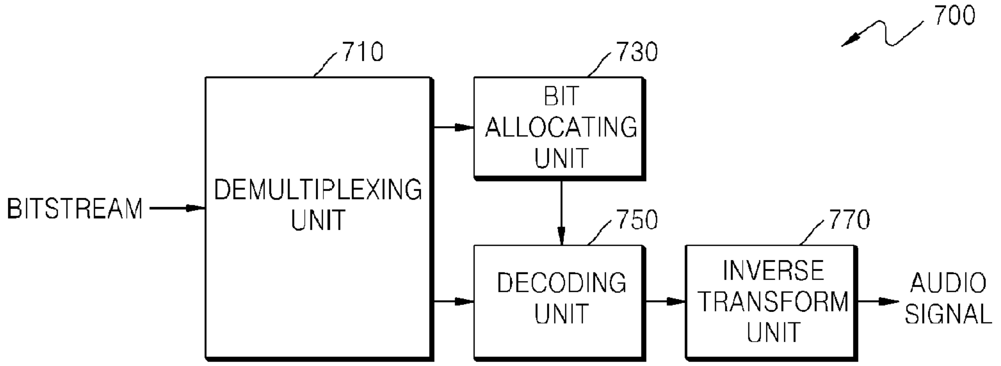
FIG. 7 is a block diagram of an audio decoding apparatus according to an exemplary embodiment.
Figure 12:
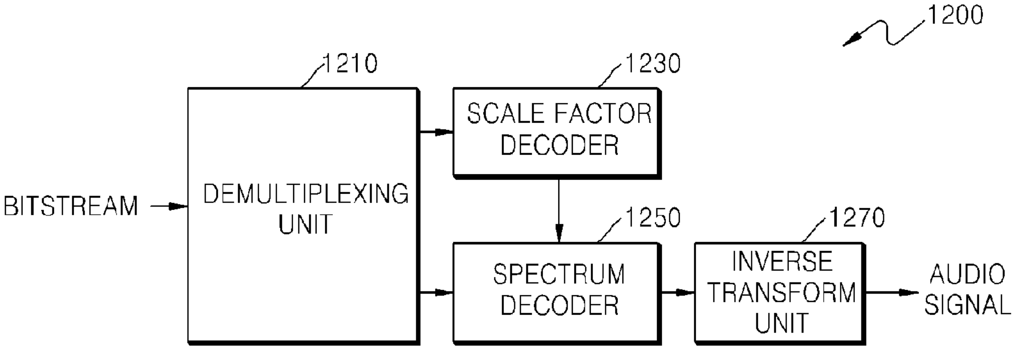
FIG. 12 is a block diagram of an audio decoding apparatus according to another exemplary embodiment.
Figure 13:
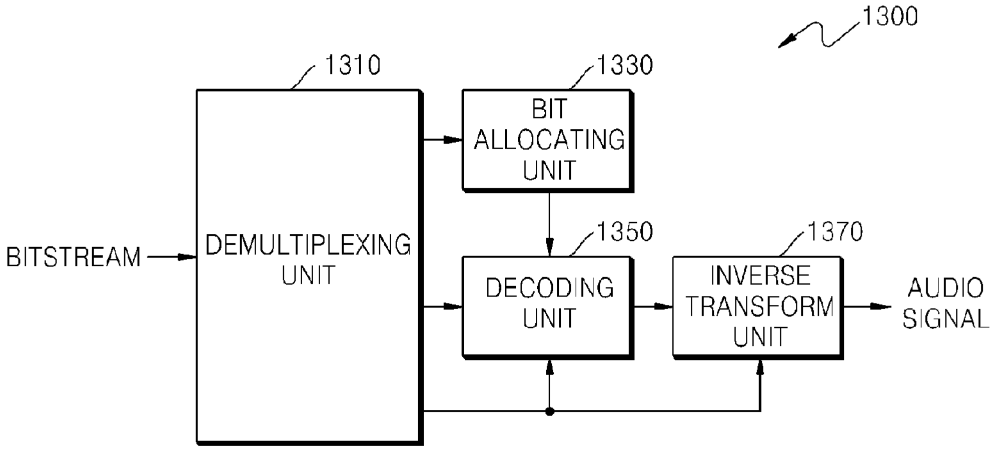
FIG. 13 is a block diagram of an audio decoding apparatus according to another exemplary embodiment.

The audio encoding apparatus 100 may generate a noise level for an optional sub-band and provide the noise level to an audio decoding apparatus (700 of FIG. 7, 1200 of FIG. 12, or 1300 of FIG. 13).

Figure 2:
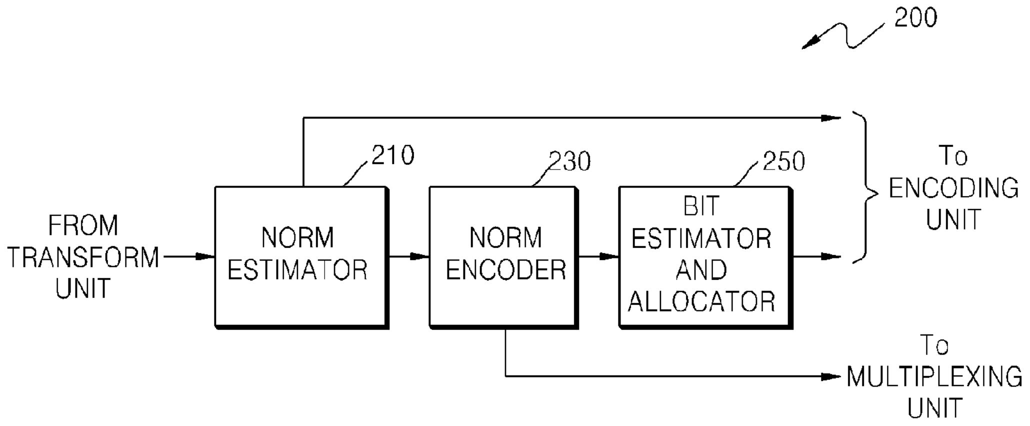
FIG. 2 is a block diagram of a bit allocating unit in the audio encoding apparatus of FIG. 1, according to an exemplary embodiment.

FIG. 2 is a block diagram of a bit allocating unit 200 corresponding to the bit allocating unit 150 in the audio encoding apparatus 100 of FIG. 1, according to an exemplary embodiment.

The bit allocating unit 200 of FIG. 2 may include a Norm estimator 210, a Norm encoder 230, and a bit estimator and allocator 250. The components of the bit allocating unit 200 may be integrated in at least one module and implemented by at least one processor.

Referring to FIG. 2, the Norm estimator 210 may obtain a Norm value corresponding to average spectral energy based on each sub-band. For example, the Norm value may be calculated by Equation 1 applied in ITU-T G.719 but is not limited thereto.

$$N(p) = \sqrt{\frac{1}{L_p}\sum_{k=s_p}^{e_p} y(k)^2},\ p = 0, \ldots , P-1 \tag{1}$$

In Equation 1, when P sub-bands or sub-sectors exist in one frame, N(p) denotes a Norm value of a pth sub-band or sub-sector, $L_p$ denotes a length of the pth sub-band or sub-sector, i.e., the number of samples or spectral coefficients, $s_p$ and $e_p$ denote a starting sample and a last sample of the pth sub-band, respectively, and y(k) denotes a sample size or a spectral coefficient (i.e., energy).

The Norm value obtained based on each sub-band may be provided to the encoding unit (170 of FIG. 1).

The Norm encoder 230 may quantize and lossless encode the Norm value obtained based on each sub-band. The Norm value quantized based on each sub-band or the Norm value obtained by dequantizing the quantized Norm value may be provided to the bit estimator and allocator 250. The Norm value quantized and lossless encoded based on each sub-band may be provided to the multiplexing unit (190 of FIG. 1).

The bit estimator and allocator 250 may estimate and allocate a required number of bits by using the Norm value. Preferably, the dequantized Norm value may be used so that an encoding part and a decoding part can use the same bit estimation and allocation process. In this case, a Norm value adjusted by taking a masking effect into account may be used. For example, the Norm value may be adjusted using psychacoustic weighting applied in ITU-T G.719 as in Equation 2 but is not limited thereto.

$$\tilde{I}_N^q(p)=I_N^q(p)+WSpe(p) \tag{2}$$

In Equation 2, $I_N^q(p)$ denotes an index of a quantized Norm value of the pth sub-band, $\tilde{I}_N^q(p)$ denotes an index of an adjusted Norm value of the pth sub-band, and WSpe(p) denotes an offset spectrum for the Norm value adjustment.

The bit estimator and allocator 250 may calculate a masking threshold by using the Norm value based on each sub-band and estimate a perceptually required number of bits by using the masking threshold. To do this, the Norm value obtained based on each sub-band may be equally represented as spectral energy in dB units as shown in Equation 3.

$$2\log_2\left[\sqrt{\frac{1}{L_p}\sum_{k=s_p}^{e_p} y(k)^2}\right] = 10\log_{10}\left[\sum_{k=s_p}^{e_p} y(k)^2\right]0.1\log_2 10 - \log_2(L_p) \tag{3}$$

As a method of obtaining the masking threshold by using spectral energy, various well-known methods may be used. That is, the masking threshold is a value corresponding to Just Noticeable Distortion (JND), and when a quantization noise is less than the masking threshold, perceptual noise cannot be perceived. Thus, a minimum number of bits required not to perceive perceptual noise may be calculated using the masking threshold. For example, a Signal-to-Mask Ratio (SMR) may be calculated by using a ratio of the Norm value to the masking threshold based on each sub-band, and the number of bits satisfying the masking threshold may be estimated by using a relationship of 6.025 dB≈1 bit with respect to the calculated SMR. Although the estimated number of bits is the minimum number of bits required not to perceive the perceptual noise, since there is no need to use more than the estimated number of bits in terms of compression, the estimated number of bits may be considered as a maximum number of bits allowable based on each sub-band (hereinafter, an allowable number of bits). The allowable number of bits of each sub-band may be represented in decimal point units.

The bit estimator and allocator 250 may perform bit allocation in decimal point units by using the Norm value based on each sub-band. In this case, bits are sequentially allocated from a sub-band having a larger Norm value than the others, and it may be adjusted that more bits are allocated to a perceptually important sub-band by weighting according to perceptual importance of each sub-band with respect to the Norm value based on each sub-band. The perceptual importance may be determined through, for example, psychoacoustic weighting as in ITU-T G.719.

The bit estimator and allocator 250 may sequentially allocate bits to samples from a sub-band having a larger Norm value than the others. In other words, firstly, bits per sample are allocated for a sub-band having the maximum Norm value, and a priority of the sub-band having the maximum Norm value is changed by decreasing the Norm value of the sub-band by predetermined units so that bits are allocated to another sub-band. This process is repeatedly performed until the total number B of bits allowable in the given frame is clearly allocated.

The bit estimator and allocator 250 may finally determine the allocated number of bits by limiting the allocated number of bits not to exceed the estimated number of bits, i.e., the allowable number of bits, for each sub-band. For all sub-bands, the allocated number of bits is compared with the estimated number of bits, and if the allocated number of bits is greater than the estimated number of bits, the allocated number of bits is limited to the estimated number of bits. If the allocated number of bits of all sub-bands in the given frame, which is obtained as a result of the bit-number limitation, is less than the total number B of bits allowable in the given frame, the number of bits corresponding to the difference may be uniformly distributed to all the sub-bands or non-uniformly distributed according to perceptual importance.

Since the number of bits allocated to each sub-band can be determined in decimal point units and limited to the allowable number of bits, a total number of bits of a given frame may be efficiently distributed.

According to an exemplary embodiment, a detailed method of estimating and allocating the number of bits required for each sub-band is as follows. According to this method, since the number of bits allocated to each sub-band can be determined at once without several repetition times, complexity may be lowered.

For example, a solution, which may optimize quantization distortion and the number of bits allocated to each sub-band, may be obtained by applying a Lagrange's function represented by Equation 4.

$$L=D+\lambda(\Sigma N_b L_b - B) \quad (4)$$

In Equation 4, L denotes the Lagrange's function, D denotes quantization distortion, B denotes the total number of bits allowable in the given frame, $N_b$ denotes the number of samples of a b-th sub-band, and $L_b$ denotes the number of bits allocated to the b-th sub-band. That is, $N_b L_b$ denotes the number of bits allocated to the bth sub-band. Λ denotes the Lagrange multiplier being an optimization coefficient.

By using Equation 4, $L_b$ for minimizing a difference between the total number of bits allocated to sub-bands included in the given frame and the allowable number of bits for the given frame may be determined while considering the quantization distortion.

The quantization distortion D may be defined by Equation 5.

$$D = \frac{\sum_i (x_i - \tilde{x}_i)^2}{\sum_i x_i^2} \quad (5)$$

In Equation 5, $x_i$ denotes an input spectrum, and $\tilde{x}_i$ denotes a decoded spectrum. That is, the quantization distortion D may be defined as a Mean Square Error (MSE) with respect to the input spectrum $\tilde{x}_i$ and the decoded spectrum $\tilde{x}_i$ in an arbitrary frame.

The denominator in Equation 5 is a constant value determined by a given input spectrum, and accordingly, since the denominator in Equation 5 does not affect optimization, Equation 7 may be simplified by Equation 6.

$$L = \sum_i (x_i - \tilde{x}_i)^2 + \lambda\left(\sum N_b L_b - B\right) \quad (6)$$

A Norm value $g_b$, which is average spectral energy of the bth sub-band with respect to the input spectrum $x_i$, may be defined by Equation 7, a Norm value $n_b$ quantized by a log scale may be defined by Equation 8, and a dequantized Norm value $\tilde{g}_b$ may be defined by Equation 9.

$$g_b = \sqrt{\frac{\sum_{i=s_b}^{e_b} x_i^2}{N_b}} \quad (7)$$

$$n_b = \lfloor 2\log_2 g_b + 0.5 \rfloor \quad (8)$$

$$\tilde{g}_b = 2^{0.5 n_b} \quad (9)$$

In Equation 7, $s_b$ and $e_b$ denote a starting sample and a last sample of the bth sub-band, respectively.

A normalized spectrum $y_i$ is generated by dividing the input spectrum $x_i$ by the dequantized Norm value $\tilde{g}_b$ as in Equation 10, and a decoded spectrum $\tilde{x}_i$ is generated by multiplying a restored normalized spectrum $\tilde{y}_i$ by the dequantized Norm value $\tilde{g}_b$ as in Equation 11.

$$y_i = \frac{x_i}{\tilde{g}_b},\ i \in [s_b, \ldots e_b] \quad (10)$$

$$\tilde{x}_i = \tilde{y}_i \tilde{g}_b,\ i \in [s_b, \ldots e_b] \quad (11)$$

The quantization distortion term may be arranged by Equation 12 by using Equations 9 to 11.

$$\sum_i (x_i - \tilde{x}_i)^2 = \sum_b \tilde{g}_b^2 \sum_{i\in b} (y_i - \tilde{y}_i)^2 = \sum_b 2^{n_b} \sum_{i\in b} (y_i - \tilde{y}_i)^2 \quad (12)$$

Commonly, from a relationship between quantization distortion and the allocated number of bits, it is defined that a Signal-to-Noise Ratio (SNR) increases by 6.02 dB every time 1 bit per sample is added, and by using this, quantization distortion of the normalized spectrum may be defined by Equation 13.

$$\frac{\sum_{i\in b} (y_i - \tilde{y}_i)^2}{\sum_i y_i^2} = \frac{\sum_{i\in b} (y_i - \tilde{y}_i)^2}{N_b} = 2^{-2L_b} \quad (13)$$

In a case of actual audio coding, Equation 14 may be defined by applying a dB scale value C, which may vary according to signal characteristics, without fixing the relationship of 1 bit/sample≈6.025 dB.

$$\sum_{i\in b} (y_i - \tilde{y}_i)^2 = 2^{-CL_b} N_b \quad (14)$$

In Equation 14, when C is 2, 1 bit/sample corresponds to 6.02 dB, and when C is 3, 1 bit/sample corresponds to 9.03 dB.

Thus, Equation 6 may be represented by Equation 15 from Equations 12 and 14.

$$L = \sum_b 2^{n_b} 2^{-CL_b} N_b + \lambda\left(\sum_b N_b L_b - B\right) \quad (15)$$

To obtain optimal $L_b$ and λ from Equation 15, a partial differential is performed for Lb and λ as in Equation 16.

$$\frac{\partial L}{\partial L_b} = -C 2^{n_b - CL_b} N_b \ln 2 + \lambda N_b = 0 \quad (16)$$

$$\frac{\partial L}{\partial \lambda} = \sum N_b L_b - B = 0$$

When Equation 16 is arranged, $L_b$ may be represented by Equation 17.

$$L_b = \frac{1}{C}\left(n_b - \frac{\sum_b N_b n_b - CB}{\sum_b N_b}\right) \tag{17}$$

By using Equation 17, the allocated number of bits $L_b$ per sample of each sub-band, which may maximize the SNR of the input spectrum, may be estimated in a range of the total number B of bits allowable in the given frame.

The allocated number of bits based on each sub-band, which is determined by the bit estimator and allocator 250 may be provided to the encoding unit (170 of FIG. 1).

Figure 3:
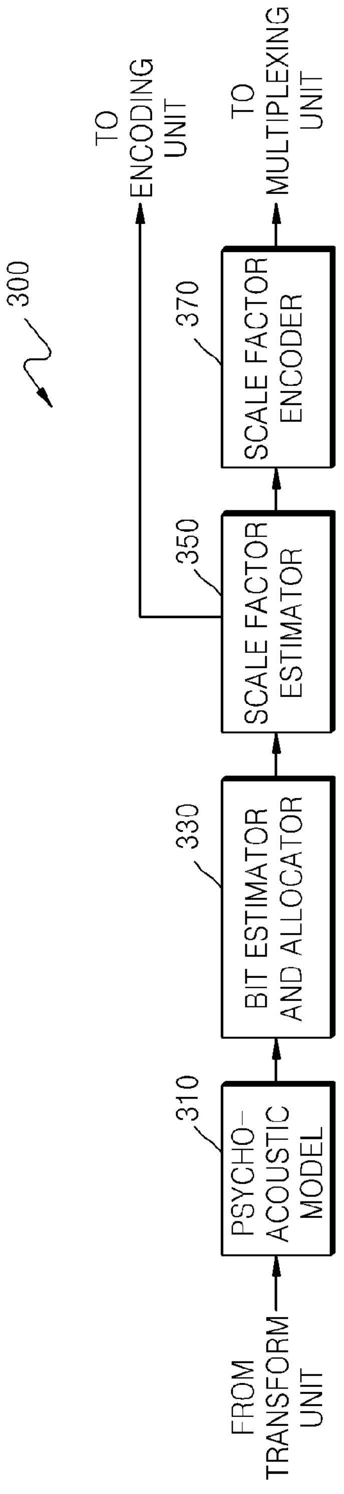
FIG. 3 is a block diagram of a bit allocating unit in the audio encoding apparatus of FIG. 1, according to another exemplary embodiment.

FIG. 3 is a block diagram of a bit allocating unit 300 corresponding to the bit allocating unit 150 in the audio encoding apparatus 100 of FIG. 1, according to another exemplary embodiment.

The bit allocating unit 300 of FIG. 3 may include a psycho-acoustic model 310, a bit estimator and allocator 330, a scale factor estimator 350, and a scale factor encoder 370. The components of the bit allocating unit 300 may be integrated in at least one module and implemented by at least one processor.

Referring to FIG. 3, the psycho-acoustic model 310 may obtain a masking threshold for each sub-band by receiving an audio spectrum from the transform unit (130 of FIG. 1).

The bit estimator and allocator 330 may estimate a perceptually required number of bits by using a masking threshold based on each sub-band. That is, an SMR may be calculated based on each sub-band, and the number of bits satisfying the masking threshold may be estimated by using a relationship of 6.025 dB≈1 bit with respect to the calculated SMR. Although the estimated number of bits is the minimum number of bits required not to perceive the perceptual noise, since there is no need to use more than the estimated number of bits in terms of compression, the estimated number of bits may be considered as a maximum number of bits allowable based on each sub-band (hereinafter, an allowable number of bits). The allowable number of bits of each sub-band may be represented in decimal point units.

The bit estimator and allocator 330 may perform bit allocation in decimal point units by using spectral energy based on each sub-band. In this case, for example, the bit allocating method using Equations 7 to 20 may be used.

The bit estimator and allocator 330 compares the allocated number of bits with the estimated number of bits for all sub-bands, if the allocated number of bits is greater than the estimated number of bits, the allocated number of bits is limited to the estimated number of bits. If the allocated number of bits of all sub-bands in a given frame, which is obtained as a result of the bit-number limitation, is less than the total number B of bits allowable in the given frame, the number of bits corresponding to the difference may be uniformly distributed to all the sub-bands or non-uniformly distributed according to perceptual importance.

The scale factor estimator 350 may estimate a scale factor by using the allocated number of bits finally determined based on each sub-band. The scale factor estimated based on each sub-band may be provided to the encoding unit (170 of FIG. 1).

The scale factor encoder 370 may quantize and lossless encode the scale factor estimated based on each sub-band. The scale factor encoded based on each sub-band may be provided to the multiplexing unit (190 of FIG. 1).

Figure 4:
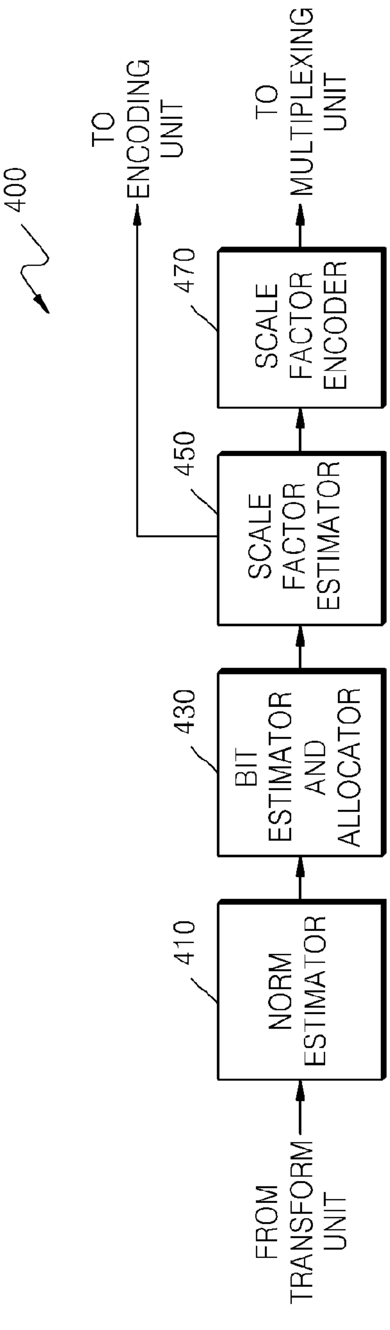
FIG. 4 is a block diagram of a bit allocating unit in the audio encoding apparatus of FIG. 1, according to another exemplary embodiment.

FIG. 4 is a block diagram of a bit allocating unit 400 corresponding to the bit allocating unit 150 in the audio encoding apparatus 100 of FIG. 1, according to another exemplary embodiment.

The bit allocating unit 400 of FIG. 4 may include a Norm estimator 410, a bit estimator and allocator 430, a scale factor estimator 450, and a scale factor encoder 470. The components of the bit allocating unit 400 may be integrated in at least one module and implemented by at least one processor.

Referring to FIG. 4, the Norm estimator 410 may obtain a Norm value corresponding to average spectral energy based on each sub-band.

The bit estimator and allocator 430 may obtain a masking threshold by using spectral energy based on each sub-band and estimate the perceptually required number of bits, i.e., the allowable number of bits, by using the masking threshold.

The bit estimator and allocator 430 may perform bit allocation in decimal point units by using spectral energy based on each sub-band. In this case, for example, the bit allocating method using Equations 7 to 20 may be used.

The bit estimator and allocator 430 compares the allocated number of bits with the estimated number of bits for all sub-bands, if the allocated number of bits is greater than the estimated number of bits, the allocated number of bits is limited to the estimated number of bits. If the allocated number of bits of all sub-bands in a given frame, which is obtained as a result of the bit-number limitation, is less than the total number B of bits allowable in the given frame, the number of bits corresponding to the difference may be uniformly distributed to all the sub-bands or non-uniformly distributed according to perceptual importance.

The scale factor estimator 450 may estimate a scale factor by using the allocated number of bits finally determined based on each sub-band. The scale factor estimated based on each sub-band may be provided to the encoding unit (170 of FIG. 1).

The scale factor encoder 470 may quantize and lossless encode the scale factor estimated based on each sub-band. The scale factor encoded based on each sub-band may be provided to the multiplexing unit (190 of FIG. 1).

Figure 5:
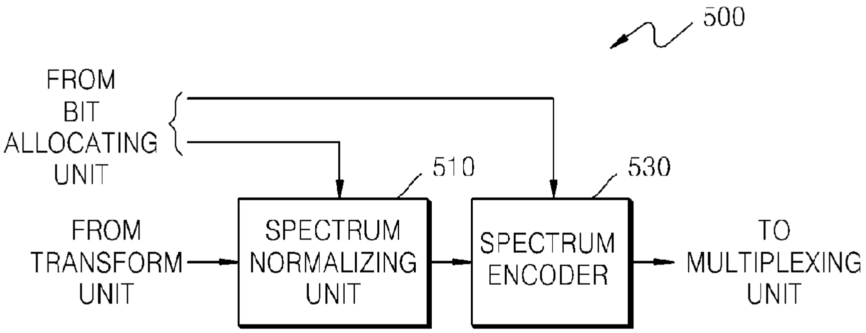
FIG. 5 is a block diagram of an encoding unit in the audio encoding apparatus of FIG. 1, according to an exemplary embodiment.

FIG. 5 is a block diagram of an encoding unit 500 corresponding to the encoding unit 170 in the audio encoding apparatus 100 of FIG. 1, according to an exemplary embodiment.

The encoding unit 500 of FIG. 5 may include a spectrum normalization unit 510 and a spectrum encoder 530. The components of the encoding unit 500 may be integrated in at least one module and implemented by at least one processor.

Referring to FIG. 5, the spectrum normalization unit 510 may normalize a spectrum by using the Norm value provided from the bit allocating unit (150 of FIG. 1).

The spectrum encoder 530 may quantize the normalized spectrum by using the allocated number of bits of each sub-band and lossless encode the quantization result. For example, factorial pulse coding may be used for the spectrum encoding but is not limited thereto. According to the factorial pulse coding, information, such as a pulse position, a pulse magnitude, and a pulse sign, may be represented in a factorial form within a range of the allocated number of bits.

The information regarding the spectrum encoded by the spectrum encoder 530 may be provided to the multiplexing unit (190 of FIG. 1).

Figure 6:
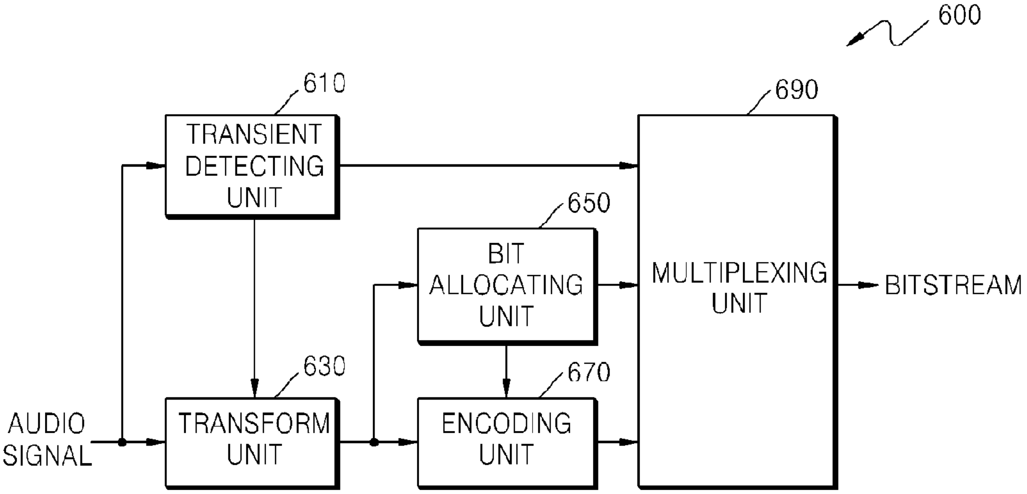
FIG. 6 is a block diagram of an audio encoding apparatus according to another exemplary embodiment.

FIG. 6 is a block diagram of an audio encoding apparatus 600 according to another exemplary embodiment.

The audio encoding apparatus 600 of FIG. 6 may include a transient detecting unit 610, a transform unit 630, a bit allocating unit 650, an encoding unit 670, and a multiplexing unit 690. The components of the audio encoding apparatus 600 may be integrated in at least one module and implemented by at least one processor. Since there is a difference in that the audio encoding apparatus 600 of FIG. 6 further includes the transient detecting unit 610 when the audio encoding apparatus 600 of FIG. 6 is compared with the audio encoding apparatus 100 of FIG. 1, a detailed description of common components is omitted herein.

Referring to FIG. 6, the transient detecting unit 610 may detect an interval indicating a transient characteristic by analyzing an audio signal. Various well-known methods may be used for the detection of a transient interval. Transient signaling information provided from the transient detecting unit 610 may be included in a bitstream through the multiplexing unit 690.

The transform unit 630 may determine a window size used for transform according to the transient interval detection result and perform time-domain to frequency-domain transform based on the determined window size. For example, a short window may be applied to a sub-band from which a transient interval is detected, and a long window may be applied to a sub-band from which a transient interval is not detected.

The bit allocating unit 650 may be implemented by one of the bit allocating units 200, 300, and 400 of FIGS. 2, 3, and 4, respectively.

The encoding unit 670 may determine a window size used for encoding according to the transient interval detection result.

The audio encoding apparatus 600 may generate a noise level for an optional sub-band and provide the noise level to an audio decoding apparatus (700 of FIG. 7, 1200 of FIG. 12, or 1300 of FIG. 13).

FIG. 7 is a block diagram of an audio decoding apparatus 700 according to an exemplary embodiment.

The audio decoding apparatus 700 of FIG. 7 may include a demultiplexing unit 710, a bit allocating unit 730, a decoding unit 750, and an inverse transform unit 770. The components of the audio decoding apparatus may be integrated in at least one module and implemented by at least one processor.

Referring to FIG. 7, the demultiplexing unit 710 may demultiplex a bitstream to extract a quantized and lossless-encoded Norm value and information regarding an encoded spectrum.

The bit allocating unit 730 may obtain a dequantized Norm value from the quantized and lossless-encoded Norm value based on each sub-band and determine the allocated number of bits by using the dequantized Norm value. The bit allocating unit 730 may operate substantially the same as the bit allocating unit 150 or 650 of the audio encoding apparatus 100 or 600. When the Norm value is adjusted by the psychoacoustic weighting in the audio encoding apparatus 100 or 600, the dequantized Norm value may be adjusted by the audio decoding apparatus 700 in the same manner.

The decoding unit 750 may lossless decode and dequantize the encoded spectrum by using the information regarding the encoded spectrum provided from the demultiplexing unit 710. For example, pulse decoding may be used for the spectrum decoding.

The inverse transform unit 770 may generate a restored audio signal by transforming the decoded spectrum to the time domain.

Figure 8:
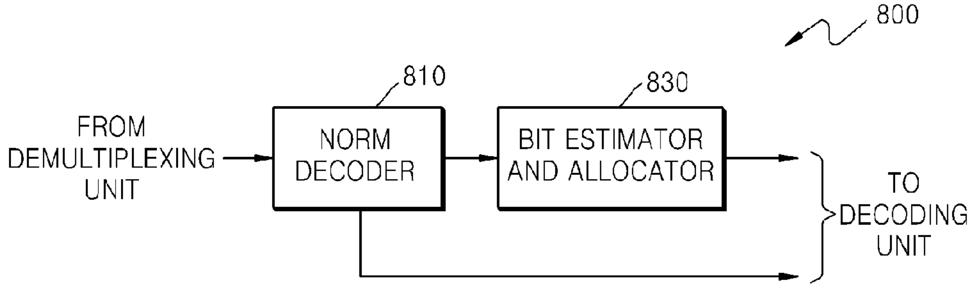
FIG. 8 is a block diagram of a bit allocating unit in the audio decoding apparatus of FIG. 7, according to an exemplary embodiment.

FIG. 8 is a block diagram of a bit allocating unit 800 in the audio decoding apparatus 700 of FIG. 7, according to an exemplary embodiment.

The bit allocating unit 800 of FIG. 8 may include a Norm decoder 810 and a bit estimator and allocator 830. The components of the bit allocating unit 800 may be integrated in at least one module and implemented by at least one processor.

Referring to FIG. 8, the Norm decoder 810 may obtain a dequantized Norm value from the quantized and lossless-encoded Norm value provided from the demultiplexing unit (710 of FIG. 7).

The bit estimator and allocator 830 may determine the allocated number of bits by using the dequantized Norm value. In detail, the bit estimator and allocator 830 may obtain a masking threshold by using spectral energy, i.e., the Norm value, based on each sub-band and estimate the perceptually required number of bits, i.e., the allowable number of bits, by using the masking threshold.

The bit estimator and allocator 830 may perform bit allocation in decimal point units by using the spectral energy, i.e., the Norm value, based on each sub-band. In this case, for example, the bit allocating method using Equations 7 to 20 may be used.

The bit estimator and allocator 830 compares the allocated number of bits with the estimated number of bits for all sub-bands, if the allocated number of bits is greater than the estimated number of bits, the allocated number of bits is limited to the estimated number of bits. If the allocated number of bits of all sub-bands in a given frame, which is obtained as a result of the bit-number limitation, is less than the total number B of bits allowable in the given frame, the number of bits corresponding to the difference may be uniformly distributed to all the sub-bands or non-uniformly distributed according to perceptual importance.

Figure 9:
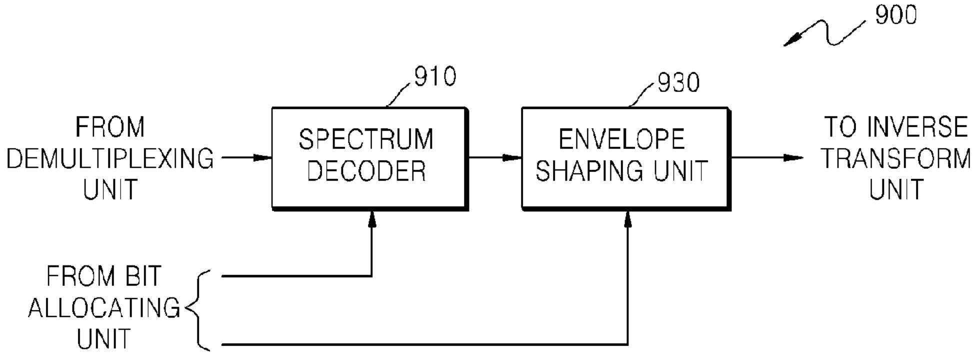
FIG. 9 is a block diagram of a decoding unit in the audio decoding apparatus of FIG. 7, according to an exemplary embodiment.

FIG. 9 is a block diagram of a decoding unit 900 corresponding to the decoding unit 750 in the audio decoding apparatus 700 of FIG. 7, according to an exemplary embodiment.

The decoding unit 900 of FIG. 9 may include a spectrum decoder 910 and an envelope shaping unit 930. The components of the decoding unit 900 may be integrated in at least one module and implemented by at least one processor.

Referring to FIG. 9, the spectrum decoder 910 may lossless decode and dequantize the encoded spectrum by using the information regarding the encoded spectrum provided from the demultiplexing unit (710 of FIG. 7) and the allocated number of bits provided from the bit allocating unit (730 of FIG. 7). The decoded spectrum from the spectrum decoder 910 is a normalized spectrum.

The envelope shaping unit 930 may restore a spectrum before the normalization by performing envelope shaping on the normalized spectrum provided from the spectrum decoder 910 by using the dequantized Norm value provided from the bit allocating unit (730 of FIG. 7).

Figure 10:
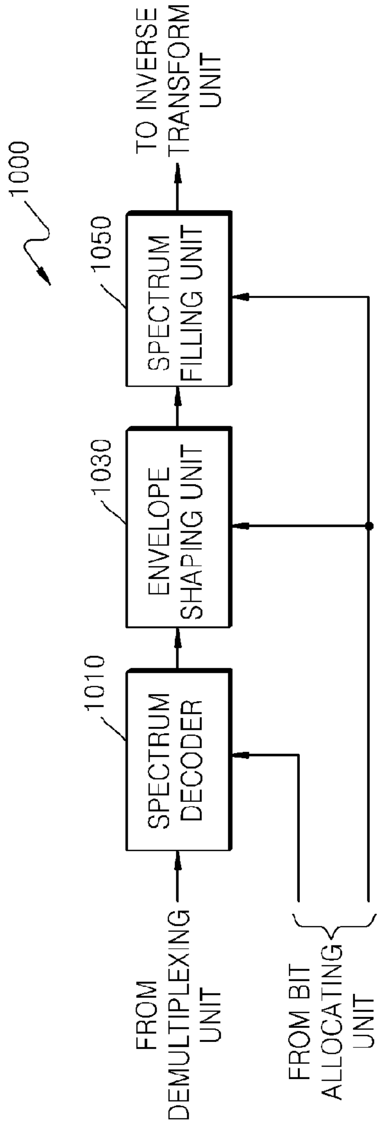
FIG. 10 is a block diagram of a decoding unit in the audio decoding apparatus of FIG. 7, according to another exemplary embodiment.

FIG. 10 is a block diagram of a decoding unit 1000 corresponding to the decoding unit 750 in the audio decoding apparatus 700 of FIG. 7, according to an exemplary embodiment.

The decoding unit 1000 of FIG. 9 may include a spectrum decoder 1010, an envelope shaping unit 1030, and a spectrum filling unit 1050. The components of the decoding unit 1000 may be integrated in at least one module and implemented by at least one processor.

Referring to FIG. 10, the spectrum decoder 1010 may lossless decode and dequantize the encoded spectrum by using the information regarding the encoded spectrum provided from the demultiplexing unit (710 of FIG. 7) and the allocated number of bits provided from the bit allocating unit (730 of FIG. 7). The decoded spectrum from the spectrum decoder 1010 is a normalized spectrum.

The envelope shaping unit 1030 may restore a spectrum before the normalization by performing envelope shaping on the normalized spectrum provided from the spectrum decoder 1010 by using the dequantized Norm value provided from the bit allocating unit (730 of FIG. 7).

When a sub-band, including a part dequantized to 0, exists in the spectrum provided from the envelope shaping unit 1030, the spectrum filling unit 1050 may fill a noise component in the part dequantized to 0 in the sub-band. According to an exemplary embodiment, the noise component may be randomly generated or generated by copying a spectrum of a sub-band dequantized to a value not 0, which is adjacent to the sub-band including the part dequantized to 0, or a spectrum of a sub-band dequantized to a value not 0. According to another exemplary embodiment, energy of the noise component may be adjusted by generating a noise component for the sub-band including the part dequantized to 0 and using a ratio of energy of the noise component to the dequantized Norm value provided from the bit allocating unit (730 of FIG. 7), i.e., spectral energy. According to another exemplary embodiment, a noise component for the sub-band including the part dequantized to 0 may be generated, and average energy of the noise component may be adjusted to be 1.

Figure 11:
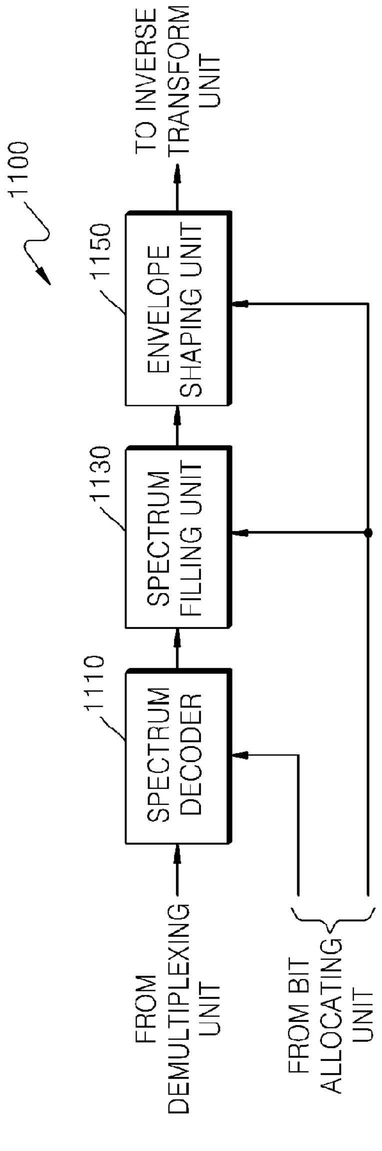
FIG. 11 is a block diagram of a decoding unit in the audio decoding apparatus of FIG. 7, according to another exemplary embodiment.

FIG. 11 is a block diagram of a decoding unit 1100 corresponding to the decoding unit 750 in the audio decoding apparatus 700 of FIG. 7, according to another exemplary embodiment.

The decoding unit 1100 of FIG. 11 may include a spectrum decoder 1110, a spectrum filling unit 1130, and an envelope shaping unit 1150. The components of the decoding unit 1100 may be integrated in at least one module and implemented by at least one processor. Since there is a difference in that an arrangement of the spectrum filling unit 1130 and the envelope shaping unit 1150 is different when the decoding unit 1100 of FIG. 11 is compared with the decoding unit 1000 of FIG. 10, a detailed description of common components is omitted herein.

Referring to FIG. 11, when a sub-band, including a part dequantized to 0, exists in the normalized spectrum provided from the spectrum decoder 1110, the spectrum filling unit 1130 may fill a noise component in the part dequantized to 0 in the sub-band. In this case, various noise filling methods applied to the spectrum filling unit 1050 of FIG. 10 may be used. Preferably, for the sub-band including the part dequantized to 0, the noise component may be generated, and average energy of the noise component may be adjusted to be 1.

The envelope shaping unit 1150 may restore a spectrum before the normalization for the spectrum including the sub-band in which the noise component is filled by using the dequantized Norm value provided from the bit allocating unit (730 of FIG. 7).

FIG. 12 is a block diagram of an audio decoding apparatus 1200 according to another exemplary embodiment.

The audio decoding apparatus 1200 of FIG. 12 may include a demultiplexing unit 1210, a scale factor decoder 1230, a spectrum decoder 1250, and an inverse transform unit 1270. The components of the audio decoding apparatus 1200 may be integrated in at least one module and implemented by at least one processor.

Referring to FIG. 12, the demultiplexing unit 1210 may demultiplex a bitstream to extract a quantized and lossless-encoded scale factor and information regarding an encoded spectrum.

The scale factor decoder 1230 may lossless decode and dequantize the quantized and lossless-encoded scale factor based on each sub-band.

The spectrum decoder 1250 may lossless decode and dequantize the encoded spectrum by using the information regarding the encoded spectrum and the dequantized scale factor provided from the demultiplexing unit 1210. The spectrum decoding unit 1250 may include the same components as the decoding unit 1000 of FIG. 10.

The inverse transform unit 1270 may generate a restored audio signal by transforming the spectrum decoded by the spectrum decoder 1250 to the time domain.

FIG. 13 is a block diagram of an audio decoding apparatus 1300 according to another exemplary embodiment.

The audio decoding apparatus 1300 of FIG. 13 may include a demultiplexing unit 1310, a bit allocating unit 1330, a decoding unit 1350, and an inverse transform unit 1370. The components of the audio decoding apparatus 1300 may be integrated in at least one module and implemented by at least one processor.

Since there is a difference in that transient signaling information is provided to the decoding unit 1350 and the inverse transform unit 1370 when the audio decoding apparatus 1300 of FIG. 13 is compared with the audio decoding apparatus 700 of FIG. 7, a detailed description of common components is omitted herein.

Referring to FIG. 13, the decoding unit 1350 may decode a spectrum by using information regarding an encoded spectrum provided from the demultiplexing unit 1310. In this case, a window size may vary according to transient signaling information.

The inverse transform unit 1370 may generate a restored audio signal by transforming the decoded spectrum to the time domain. In this case, a window size may vary according to the transient signaling information.

Figure 14:
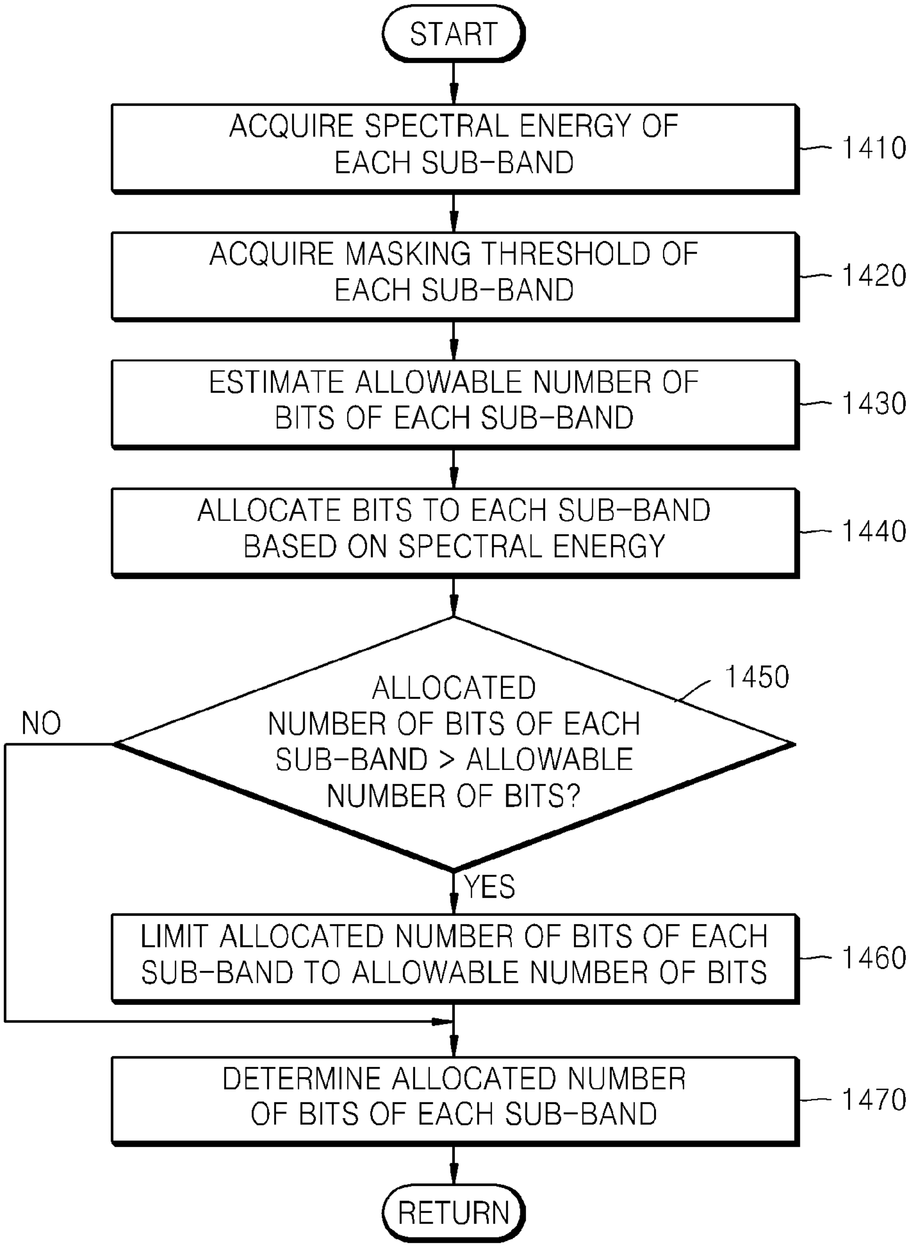
FIG. 14 is a flowchart illustrating a bit allocating method according to another exemplary embodiment.

FIG. 14 is a flowchart illustrating a bit allocating method according to another exemplary embodiment.

Referring to FIG. 14, in operation 1410, spectral energy of each sub-band is acquired. The spectral energy may be a Norm value.

In operation 1420, a masking threshold is acquired by using the spectral energy based on each sub-band.

In operation 1430, the allowable number of bits is estimated in decimal point units by using the masking threshold based on each sub-band.

In operation 1440, bits are allocated in decimal point units based on the spectral energy based on each sub-band.

In operation 1450, the allowable number of bits is compared with the allocated number of bits based on each sub-band.

In operation 1460, if the allocated number of bits is greater than the allowable number of bits for a given sub-band as a result of the comparison in operation 1450, the allocated number of bits is limited to the allowable number of bits.

In operation 1470, if the allocated number of bits is less than or equal to the allowable number of bits for a given sub-band as a result of the comparison in operation 1450, the allocated number of bits is used as it is, or the final allocated number of bits is determined for each sub-band by using the allowable number of bits limited in operation 1460.

Although not shown, if a sum of the allocated numbers of bits determined in operation 1470 for all sub-bands in a given frame is less or more than the total number of bits allowable in the given frame, the number of bits corresponding to the difference may be uniformly distributed to all the sub-bands or non-uniformly distributed according to perceptual importance.

Figure 15:
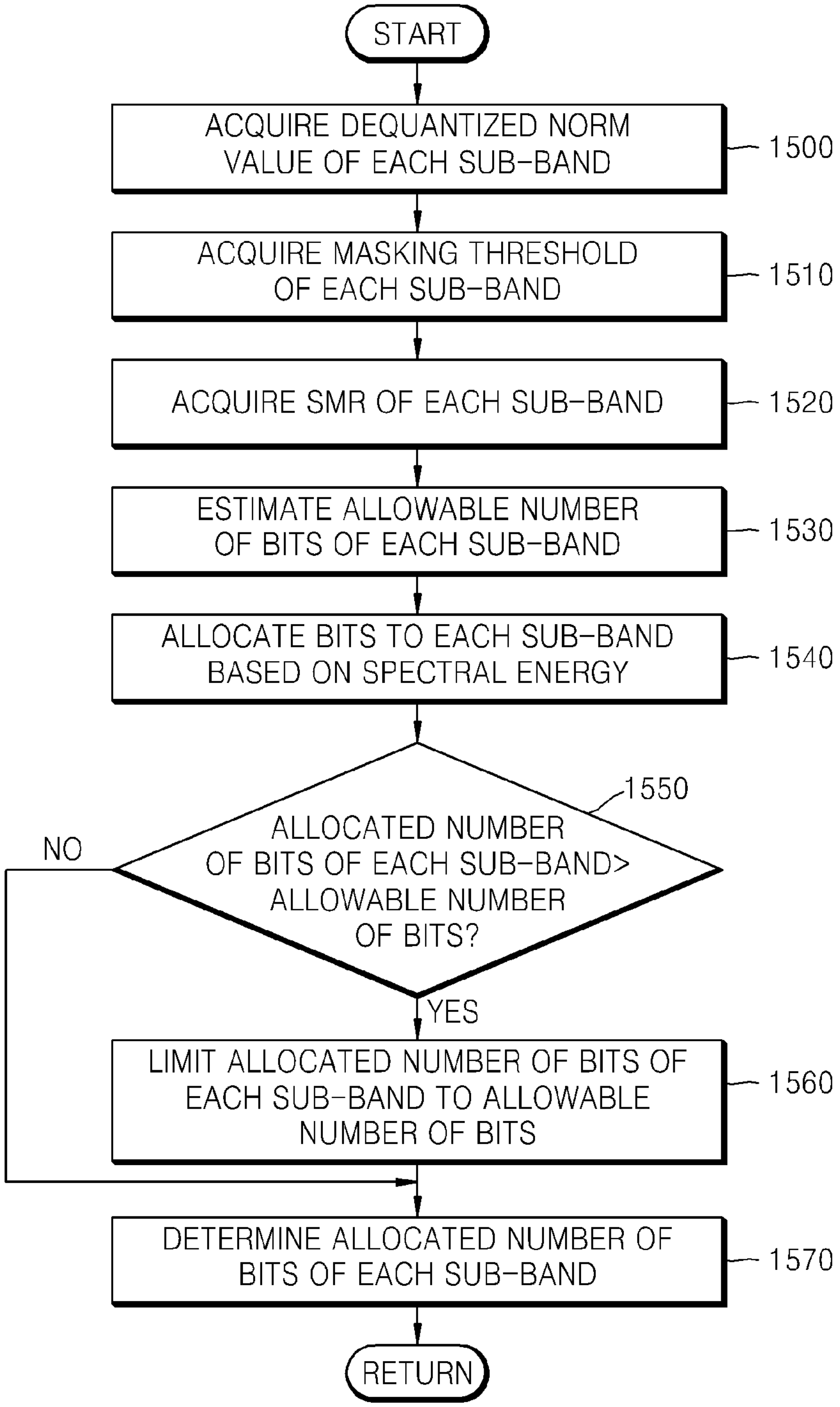
FIG. 15 is a flowchart illustrating a bit allocating method according to another exemplary embodiment.

FIG. 15 is a flowchart illustrating a bit allocating method according to another exemplary embodiment.

Referring to FIG. 15, in operation 1500, a dequantized Norm value of each sub-band is acquired.

In operation 1510, a masking threshold is acquired by using the dequantized Norm value based on each sub-band.

In operation 1520, an SMR is acquired by using the masking threshold based on each sub-band.

In operation 1530, the allowable number of bits is estimated in decimal point units by using the SMR based on each sub-band.

In operation 1540, bits are allocated in decimal point units based on the spectral energy (or the dequantized Norm value) based on each sub-band.

In operation 1550, the allowable number of bits is compared with the allocated number of bits based on each sub-band.

In operation 1560, if the allocated number of bits is greater than the allowable number of bits for a given sub-band as a result of the comparison in operation 1550, the allocated number of bits is limited to the allowable number of bits.

In operation 1570, if the allocated number of bits is less than or equal to the allowable number of bits for a given sub-band as a result of the comparison in operation 1550, the allocated number of bits is used as it is, or the final allocated number of bits is determined for each sub-band by using the allowable number of bits limited in operation 1560.

Although not shown, if a sum of the allocated numbers of bits determined in operation 1570 for all sub-bands in a given frame is less or more than the total number of bits allowable in the given frame, the number of bits corresponding to the difference may be uniformly distributed to all the sub-bands or non-uniformly distributed according to perceptual importance.

Figure 16:
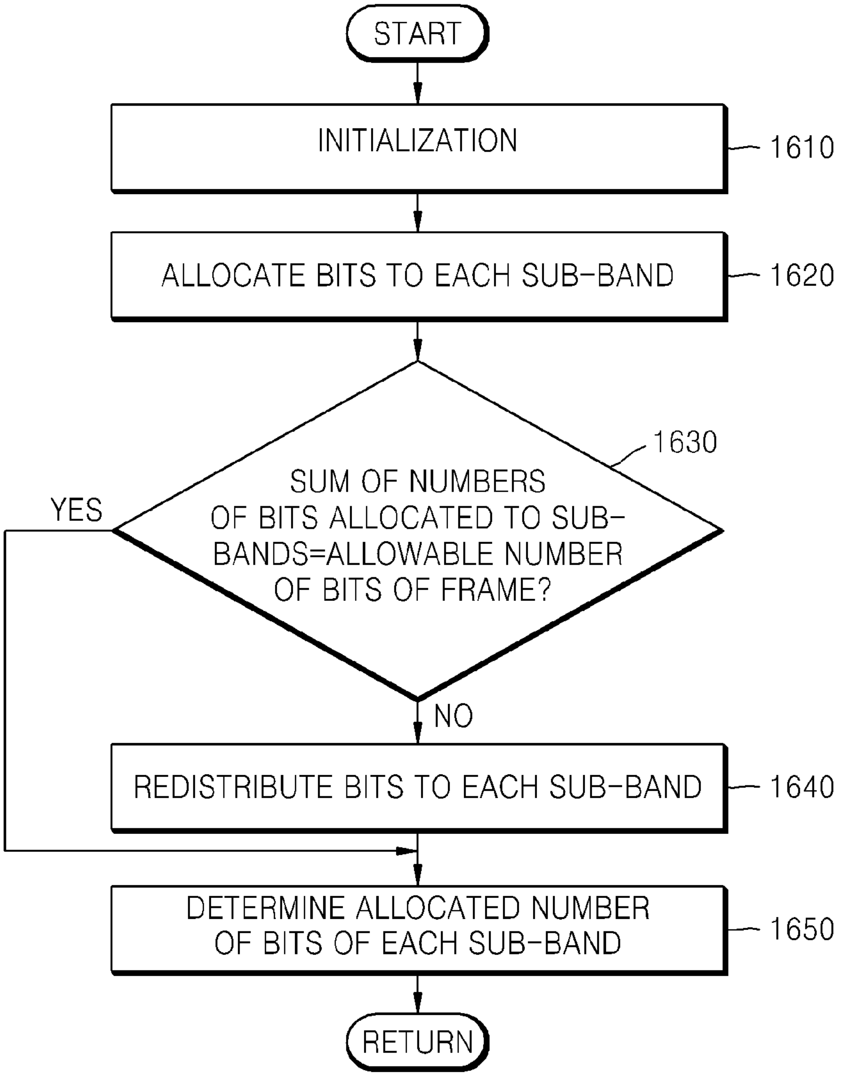
FIG. 16 is a flowchart illustrating a bit allocating method according to another exemplary embodiment.

FIG. 16 is a flowchart illustrating a bit allocating method according to another exemplary embodiment.

Referring to FIG. 16, in operation 1610, initialization is performed. As an example of the initialization, when the allocated number of bits for each sub-band is estimated by using Equation 20, the entire complexity may be reduced by calculating a constant value $$\frac{\sum N_i n_i - CB}{\sum N_i}$$

for all sub-bands.

In operation 1620, the allocated number of bits for each sub-band is estimated in decimal point units by using Equation 17. The allocated number of bits for each sub-band may be obtained by multiplying the allocated number $L_b$ of bits per sample by the number of samples per sub-band. When the allocated number $L_b$ of bits per sample of each sub-band is calculated by using Equation 17, $L_b$ may have a value less than 0. In this case, 0 is allocated to $L_b$ having a value less than 0 as in Equation 18.

$$L_b = \max\left(0, \frac{1}{C}\left(n_b - \frac{\sum_b N_b n_b - CB}{\sum_b N_b}\right)\right) \quad (18)$$

As a result, a sum of the allocated numbers of bits estimated for all sub-bands included in a given frame may be greater than the number B of bits allowable in the given frame.

In operation 1630, the sum of the allocated numbers of bits estimated for all sub-bands included in the given frame is compared with the number B of bits allowable in the given frame.

In operation 1640, bits are redistributed for each sub-band by using Equation 19 until the sum of the allocated numbers of bits estimated for all sub-bands included in the given frame is the same as the number B of bits allowable in the given frame.

$$L_b^k = \max\left(0, L_b^{k-1} - \frac{\sum_b N_b L_b^{k-1} - B}{\sum_b N_b}\right), b \in \{L_b^{k-1} \geq 0\} \quad (19)$$

In Equation 19, $L_b^{k-1}$ denotes the number of bits determined by a (k−1)th repetition, and $L_b^k$ denotes the number of bits determined by a kth repetition. The number of bits determined by every repetition must not be less than 0, and accordingly, operation 1640 is performed for sub-bands having the number of bits greater than 0.

In operation 1650, if the sum of the allocated numbers of bits estimated for all sub-bands included in the given frame is the same as the number B of bits allowable in the given frame as a result of the comparison in operation 1630, the allocated number of bits of each sub-band is used as it is, or the final allocated number of bits is determined for each sub-band by using the allocated number of bits of each sub-band, which is obtained as a result of the redistribution in operation 1640.

Figure 17:
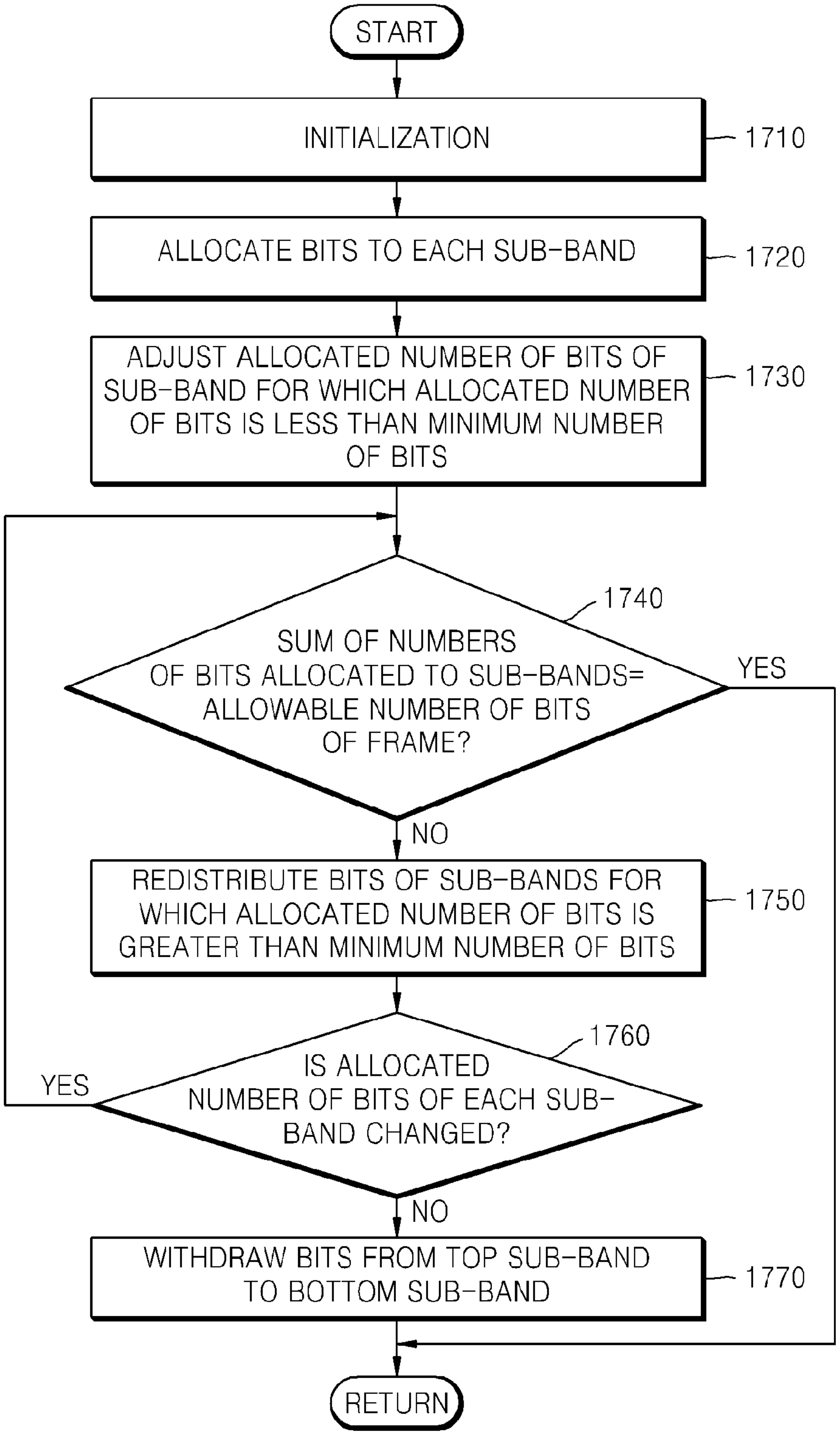
FIG. 17 is a flowchart illustrating a bit allocating method according to another exemplary embodiment.

FIG. 17 is a flowchart illustrating a bit allocating method according to another exemplary embodiment.

Referring to FIG. 17, like operation 1610 of FIG. 16, initialization is performed in operation 1710. Like operation 1620 of FIG. 16, in operation 1720, the allocated number of bits for each sub-band is estimated in decimal point units, and when the allocated number $L_b$ of bits per sample of each sub-band is less than 0, 0 is allocated to $L_b$ having a value less than 0 as in Equation 18.

In operation 1730, the minimum number of bits required for each sub-band is defined in terms of SNR, and the allocated number of bits in operation 1720 greater than 0 and less than the minimum number of bits is adjusted by limiting the allocated number of bits to the minimum number of bits. As such, by limiting the allocated number of bits of each sub-band to the minimum number of bits, the possibility of decreasing sound quality may be reduced. For example, the minimum number of bits required for each sub-band is defined as the minimum number of bits required for pulse coding in factorial pulse coding. The factorial pulse coding represents a signal by using all combinations of a pulse position not 0, a pulse magnitude, and a pulse sign. In this case, an occasional number N of all combinations, which can represent a pulse, may be represented by Equation 20.

$$N = \sum_{i=1}^{m} 2^i F(n, i) D(m, i) \quad (20)$$

In Equation 20, $2^i$ denotes an occasional number of signs representable with +/− for signals at i non-zero positions.

In Equation 20, F(n, i) may be defined by Equation 21, which indicates an occasional number for selecting the i non-zero positions for given n samples, i.e., positions.

$$F(n, i) = C_i^n = \frac{n!}{i!(n-i)!} \quad (21)$$

In Equation 20, D(m, i) may be represented by Equation 22, which indicates an occasional number for representing the signals selected at the i non-zero positions by m magnitudes.

$$D(m, i) = C_{i-1}^{m-1} = \frac{(m-1)!}{(i-1)!(m-i)!} \quad (22)$$

The number M of bits required to represent the N combinations may be represented by Equation 23.

$$M = \lceil \log_2 N \rceil \quad (23)$$

As a result, the minimum number $L_{b\_min}$ of bits required to encode a minimum of 1 pulse for $N_b$ samples in a given bth sub-band may be represented by Equation 24.

$$L_{b\_min} = 1 + \log_2 N_b \quad (24)$$

In this case, the number of bits used to transmit a gain value required for quantization may be added to the minimum number of bits required in the factorial pulse coding and may vary according to a bit rate. The minimum number of bits required based on each sub-band may be determined by a larger value from among the minimum number of bits required in the factorial pulse coding and the number $N_b$ of samples of a given sub-band as in Equation 25. For example, the minimum number of bits required based on each sub-band may be set as 1 bit per sample.

$$L_{b\_min} = \max(N_b, 1 + \log_2 N_b + L_{gain}) \quad (25)$$

When bits to be used are not sufficient in operation 1730 since a target bit rate is small, for a sub-band for which the allocated number of bits is greater than 0 and less than the minimum number of bits, the allocated number of bits is withdrawn and adjusted to 0. In addition, for a sub-band for which the allocated number of bits is smaller than those of equation 24, the allocated number of bits may be withdrawn, and for a sub-band for which the allocated number of bits is greater than those of equation 24 and smaller than the minimum number of bits of equation 25, the minimum number of bits may be allocated.

In operation 1740, a sum of the allocated numbers of bits estimated for all sub-bands in a given frame is compared with the number of bits allowable in the given frame.

In operation 1750, bits are redistributed for a sub-band to which more than the minimum number of bits is allocated until the sum of the allocated numbers of bits estimated for all sub-bands in the given frame is the same as the number of bits allowable in the given frame.

In operation 1760, it is determined whether the allocated number of bits of each sub-band is changed between a previous repetition and a current repetition for the bit redistribution. If the allocated number of bits of each sub-band is not changed between the previous repetition and the current repetition for the bit redistribution, or until the sum of the allocated numbers of bits estimated for all sub-bands in the given frame is the same as the number of bits allowable in the given frame, operations 1740 to 1760 are performed.

In operation 1770, if the allocated number of bits of each sub-band is not changed between the previous repetition and the current repetition for the bit redistribution as a result of the determination in operation 1760, bits are sequentially withdrawn from the top sub-band to the bottom sub-band, and operations 1740 to 1760 are performed until the number of bits allowable in the given frame is satisfied.

That is, for a sub-band for which the allocated number of bits is greater than the minimum number of bits of equation 25, an adjusting operation is performed while reducing the allocated number of bits, until the number of bits allowable in the given frame is satisfied. In addition, if the allocated number of bits is equal to or smaller than the minimum number of bits of equation 25 for all sub-bands and the sum of the allocated number of bits is greater than the number of bits allowable in the given frame, the allocated number of bits may be withdrawn from a high frequency band to a low frequency band.

According to the bit allocating methods of FIGS. 16 and 17, to allocate bits to each sub-band, after initial bits are allocated to each sub-band in an order of spectral energy or weighted spectral energy, the number of bits required for each sub-band may be estimated at once without repeating an operation of searching for spectral energy or weighted spectral energy several times. In addition, by redistributing bits to each sub-band until a sum of the allocated numbers of bits estimated for all sub-bands in a given frame is the same as the number of bits allowable in the given frame, efficient bit allocation is possible. In addition, by guaranteeing the minimum number of bits to an arbitrary sub-band, the generation of a spectral hole occurring since a sufficient number of spectral samples or pulses cannot be encoded due to allocation of a small number of bits may be prevented.

The methods of FIGS. 14 to 17 may be programmed and may be performed by at least one processing device, e.g., a central processing unit (CPU).

Figure 18:
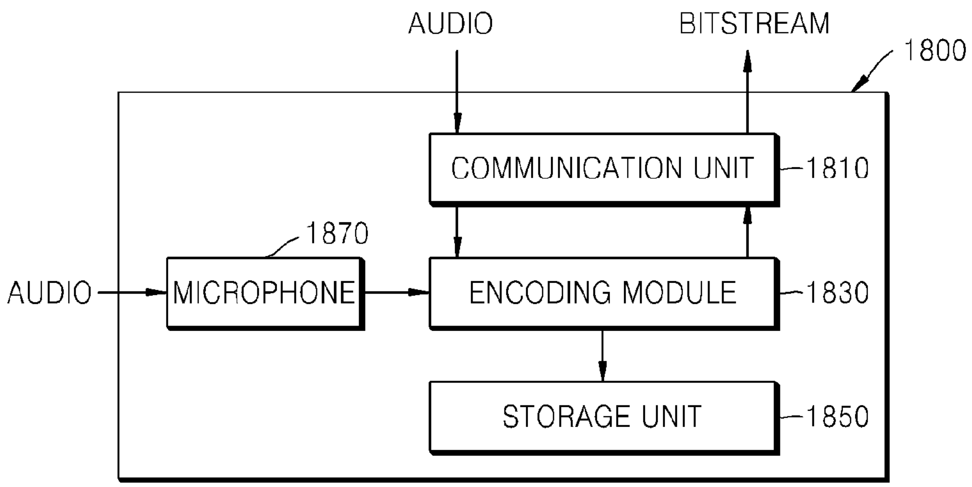
FIG. 18 is a block diagram of a multimedia device including an encoding module, according to an exemplary embodiment.

FIG. 18 is a block diagram of a multimedia device including an encoding module, according to an exemplary embodiment.

Referring to FIG. 18, the multimedia device 1800 may include a communication unit 1810 and the encoding module 1830. In addition, the multimedia device 1800 may further include a storage unit 1850 for storing an audio bitstream obtained as a result of encoding according to the usage of the audio bitstream. Moreover, the multimedia device 1800 may further include a microphone 1870. That is, the storage unit 1850 and the microphone 1870 may be optionally included. The multimedia device 1800 may further include an arbitrary decoding module (not shown), e.g., a decoding module for performing a general decoding function or a decoding module according to an exemplary embodiment. The encoding module 1830 may be implemented by at least one processor, e.g., a central processing unit (not shown) by being integrated with other components (not shown) included in the multimedia device 1800 as one body.

The communication unit 1810 may receive at least one of an audio signal or an encoded bitstream provided from the outside or transmit at least one of a restored audio signal or an encoded bitstream obtained as a result of encoding by the encoding module 1830.

The communication unit 1810 is configured to transmit and receive data to and from an external multimedia device through a wireless network, such as wireless Internet, wireless intranet, a wireless telephone network, a wireless Local Area Network (LAN), Wi-Fi, Wi-Fi Direct (WFD), third generation (3G), fourth generation (4G), Bluetooth, Infrared Data Association (IrDA), Radio Frequency Identification (RFID), Ultra WideBand (UWB), Zigbee, or Near Field Communication (NFC), or a wired network, such as a wired telephone network or wired Internet.

According to an exemplary embodiment, the encoding module 1830 may generate a bitstream by transforming an audio signal in the time domain, which is provided through the communication unit 1810 or the microphone 1870, to an audio spectrum in the frequency domain, determining the allocated number of bits in decimal point units based on frequency bands so that an SNR of a spectrum existing in a predetermined frequency band is maximized within a range of the number of bits allowable in a given frame of the audio spectrum, adjusting the allocated number of bits determined based on frequency bands, and encoding the audio spectrum by using the number of bits adjusted based on frequency bands and spectral energy.

According to another exemplary embodiment, the encoding module 1830 may generate a bitstream by transforming an audio signal in the time domain, which is provided through the communication unit 1810 or the microphone 1870, to an audio spectrum in the frequency domain, estimating the allowable number of bits in decimal point units by using a masking threshold based on frequency bands included in a given frame of the audio spectrum, estimating the allocated number of bits in decimal point units by using spectral energy, adjusting the allocated number of bits not to exceed the allowable number of bits, and encoding the audio spectrum by using the number of bits adjusted based on frequency bands and the spectral energy.

The storage unit 1850 may store the encoded bitstream generated by the encoding module 1830. In addition, the storage unit 1850 may store various programs required to operate the multimedia device 1800.

The microphone 1870 may provide an audio signal from a user or the outside to the encoding module 1830.

Figure 19:
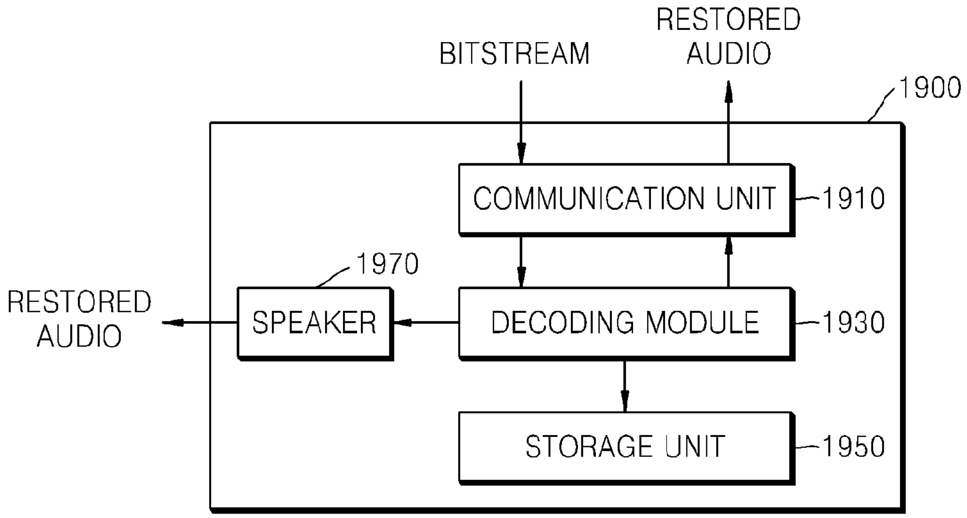
FIG. 19 is a block diagram of a multimedia device including a decoding module, according to an exemplary embodiment.

FIG. 19 is a block diagram of a multimedia device including a decoding module, according to an exemplary embodiment.

The multimedia device 1900 of FIG. 19 may include a communication unit 1910 and the decoding module 1930. In addition, according to the use of a restored audio signal obtained as a decoding result, the multimedia device 1900 of FIG. 19 may further include a storage unit 1950 for storing the restored audio signal. In addition, the multimedia device 1900 of FIG. 19 may further include a speaker 1970. That is, the storage unit 1950 and the speaker 1970 are optional. The multimedia device 1900 of FIG. 19 may further include an encoding module (not shown), e.g., an encoding module for performing a general encoding function or an encoding module according to an exemplary embodiment. The decoding module 1930 may be integrated with other components (not shown) included in the multimedia device 1900 and implemented by at least one processor, e.g., a central processing unit (CPU).

Referring to FIG. 19, the communication unit 1910 may receive at least one of an audio signal or an encoded bitstream provided from the outside or may transmit at least one of a restored audio signal obtained as a result of decoding of the decoding module 1930 or an audio bitstream obtained as a result of encoding. The communication unit 1910 may be implemented substantially and similarly to the communication unit 1810 of FIG. 18.

According to an exemplary embodiment, the decoding module 1930 may generate a restored audio signal by receiving a bitstream provided through the communication unit 1910, determining the allocated number of bits in decimal point units based on frequency bands so that an SNR of a spectrum existing in a each frequency band is maximized within a range of the allowable number of bits in a given frame, adjusting the allocated number of bits determined based on frequency bands, decoding an audio spectrum included in the bitstream by using the number of bits adjusted based on frequency bands and spectral energy, and transforming the decoded audio spectrum to an audio signal in the time domain.

According to another exemplary embodiment, the decoding module 1930 may generate a bitstream by receiving a bitstream provided through the communication unit 1910, estimating the allowable number of bits in decimal point units by using a masking threshold based on frequency bands included in a given frame, estimating the allocated number of bits in decimal point units by using spectral energy, adjusting the allocated number of bits not to exceed the allowable number of bits, decoding an audio spectrum included in the bitstream by using the number of bits adjusted based on frequency bands and the spectral energy, and transforming the decoded audio spectrum to an audio signal in the time domain.

The storage unit 1950 may store the restored audio signal generated by the decoding module 1930. In addition, the storage unit 1950 may store various programs required to operate the multimedia device 1900.

The speaker 1970 may output the restored audio signal generated by the decoding module 1930 to the outside.

Figure 20:
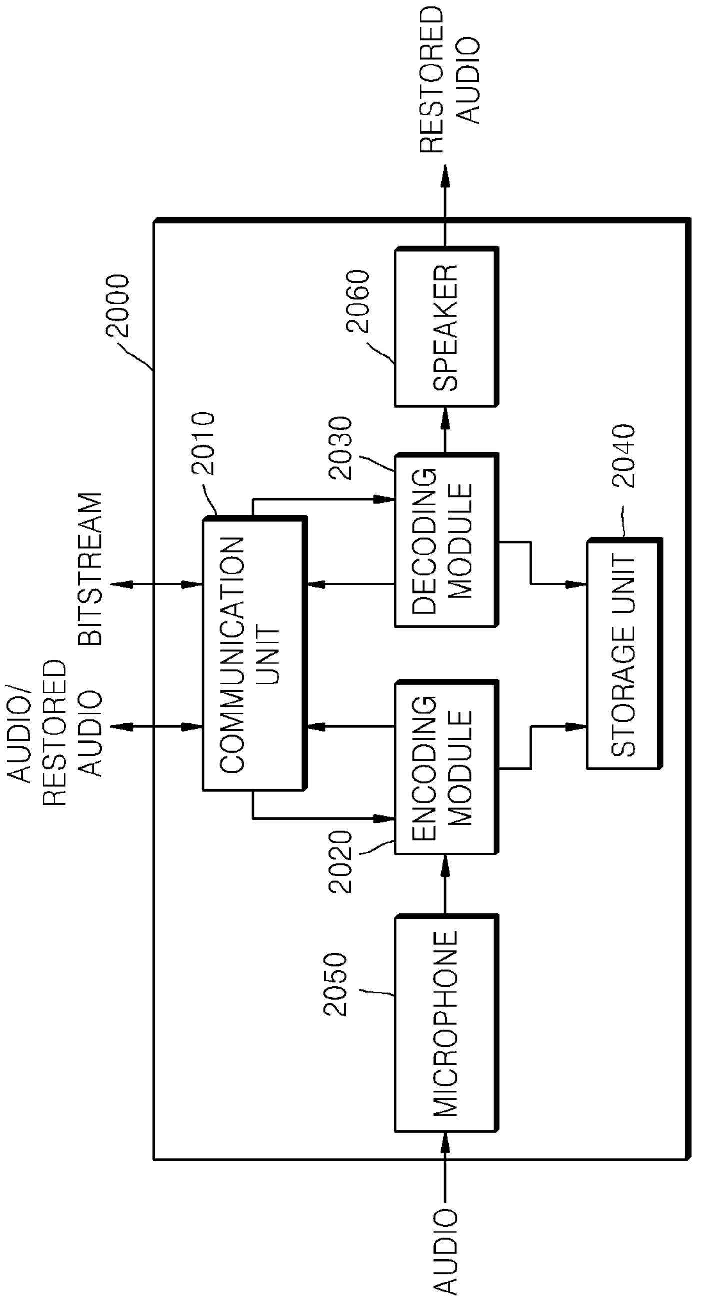
FIG. 20 is a block diagram of a multimedia device including an encoding module and a decoding module, according to an exemplary embodiment.

FIG. 20 is a block diagram of a multimedia device including an encoding module and a decoding module, according to an exemplary embodiment.

The multimedia device 2000 shown in FIG. 20 may include a communication unit 2010, an encoding module 2020, and a decoding module 2030. In addition, the multimedia device 2000 may further include a storage unit 2040 for storing an audio bitstream obtained as a result of encoding or a restored audio signal obtained as a result of decoding according to the usage of the audio bitstream or the restored audio signal. In addition, the multimedia device 2000 may further include a microphone 2050 and/or a speaker 2060. The encoding module 2020 and the decoding module 2030 may be implemented by at least one processor, e.g., a central processing unit (CPU) (not shown) by being integrated with other components (not shown) included in the multimedia device 2000 as one body.

Since the components of the multimedia device 2000 shown in FIG. 20 correspond to the components of the multimedia device 1800 shown in FIG. 18 or the components of the multimedia device 1900 shown in FIG. 19, a detailed description thereof is omitted.

Each of the multimedia devices 1800, 1900, and 2000 shown in FIGS. 18, 19, and 20 may include a voice communication only terminal, such as a telephone or a mobile phone, a broadcasting or music only device, such as a TV or an MP3 player, or a hybrid terminal device of a voice communication only terminal and a broadcasting or music only device but are not limited thereto. In addition, each of the multimedia devices 1800, 1900, and 2000 may be used as a client, a server, or a transducer displaced between a client and a server.

When the multimedia device 1800, 1900, or 2000 is, for example, a mobile phone, although not shown, the multimedia device 1800, 1900, or 2000 may further include a user input unit, such as a keypad, a display unit for displaying information processed by a user interface or the mobile phone, and a processor for controlling the functions of the mobile phone. In addition, the mobile phone may further include a camera unit having an image pickup function and at least one component for performing a function required for the mobile phone.

When the multimedia device 1800, 1900, or 2000 is, for example, a TV, although not shown, the multimedia device 1800, 1900, or 2000 may further include a user input unit, such as a keypad, a display unit for displaying received broadcasting information, and a processor for controlling all functions of the TV. In addition, the TV may further include at least one component for performing a function of the TV.

The methods according to the exemplary embodiments can be written as computer programs and can be implemented in general-use digital computers that execute the programs using a computer-readable recording medium. In addition, data structures, program commands, or data files usable in the exemplary embodiments may be recorded in a computer-readable recording medium in various manners. The computer-readable recording medium is any data storage device that can store data which can be thereafter read by a computer system. Examples of the computer-readable recording medium include magnetic media, such as hard disks, floppy disks, and magnetic tapes, optical media, such as CD-ROMs and DVDs, and magneto-optical media, such as floptical disks, and hardware devices, such as ROMs, RAMs, and flash memories, particularly configured to store and execute program commands. In addition, the computer-readable recording medium may be a transmission medium for transmitting a signal in which a program command and a data structure are designated. The program commands may include machine language codes edited by a compiler and high-level language codes executable by a computer using an interpreter.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A bit allocating method comprising:

receiving an audio signal;

generating an audio spectrum by transforming the audio signal from a time domain to a frequency domain;

fractionally estimating, by using a processor, bits to be allocated to a sub- band in a frame of the audio spectrum, in consideration of allowable bits for the frame, wherein the estimated bits are set to zero when the estimated bits of the sub- band are less than zero;

when the estimated bits of the sub-band are non-zero bits, re-distributing the estimated bits to the sub-band with non-zero bits, to allocate the bits to the sub- band;

quantizing spectral data of the sub-band using the allocated bits; and outputting a bitstream generated based on the quantized spectral data.

2. The method of claim 1, wherein the estimating is performed based on spectral energy of the sub-band.

3. The method of claim 1, wherein the estimating is performed by using the equation below $$L_b = \frac{1}{C}\left(n_b - \frac{\sum_b N_b n_b - CB}{\sum_b N_b}\right),$$

where $L_b$ denotes bits allocated to each sample in a bth sub-band, C denotes a dB scale value, $n_b$ denotes a Norm value dequantized by a log scale in the bth sub-band, $N_b$ denotes samples of the bth sub-band, and B denotes the allowable bits for the frame.

4. The method of claim 1, wherein the re-distributing comprises setting the allocated bits to zero when the allocated bits are less than predetermined minimum bits set to the sub-band.

5. The method of claim 1, wherein the re-distributing comprises limiting the allocated bits, based on predetermined minimum bits set to the sub-band.

6. The method of claim 1, wherein the re-distributing comprises setting the allocated bits to predetermined minimum bits set to the sub-band, when the allocated bits are less than the predetermined minimum bits.

7. A non-transitory computer-readable recording medium storing a computer-readable program for executing a bit allocating method comprising:

receiving an audio signal;

generating an audio spectrum by transforming the audio signal from a time domain to a frequency domain;

fractionally estimating, by using a processor, bits to be allocated to a sub-band in a frame of the audio spectrum, in consideration of allowable bits for the frame, wherein the estimated bits are set to zero when the estimated bits of the sub-band are less than zero;

when the estimated bits of the sub-band are non-zero bits, re-distributing the estimated bits to the sub-band with non-zero bits, to allocate the bits to the sub-band;

quantizing spectral data of the sub-band using the allocated bits; and outputting a bitstream generated based on the quantized spectral data.

8. A bit allocating apparatus comprising:

a processor configured:

to receive an audio signal;

to generate an audio spectrum by transforming the audio signal from a time domain to a frequency domain;

to fractionally estimate bits to be allocated to a sub-band in a frame of the audio spectrum, in consideration of allowable bits for the frame, wherein the estimated bits are set to zero when the estimated bits of the sub-band are less than zero; and when the estimated bits of the sub-band are non-zero bits, to allocate the bits to the sub-band by re-distributing the estimated bits to the sub-band with non-zero bits;

to quantize spectral data of the sub-band using the allocated bits; and to output a bitstream generated based on the quantized spectral data.

9. An audio encoding apparatus comprising:

a transform unit configured to generate an audio spectrum by transforming an audio signal from a time domain to a frequency domain;

a bit allocating unit configured to fractionally estimate bits to be allocated to a sub-band in a frame of the audio spectrum, in consideration of allowable bits for the frame, wherein the estimated bits are set to zero when the estimated bits of the sub-band are less than zero and when the estimated bits of the sub-band are non-zero bits, to allocate the bits to the sub-band by re-distributing the estimated bits to the sub-band with non-zero bits; and an encoding unit configured to encode the frame by quantizing spectral data based on the allocated bits for the sub-band, and to output a bitstream generated based on the quantized spectral data.

10. An audio decoding apparatus comprising:

a bit allocating unit configured to fractionally estimate bits to be allocated to a sub-band in a frame of a bitstream, in consideration of allowable bits for the frame, wherein the estimated bits are set to zero when the estimated bits of the sub-band are less than zero and when the estimated bits of the sub-band are non-zero bits, to allocate the bits to the sub-band by re-distributing the estimated bits to the sub-band with non-zero bits; and a decoding unit configured to decode the frame by dequantizing the frame based on the allocated bits for the sub-band;

an inverse transform unit configured to generate a reconstructed audio signal by transforming the dequantized frame into a time domain.

11. The method of claim 1, wherein the re-distributing is performed based on the allocated bits for higher bands.

12. The apparatus of claim 9, wherein the bit allocation unit is based on spectral energy of the sub-band.

13. The apparatus of claim 9, wherein the bit allocation unit is configured to limit the allocated bits, based on predetermined minimum bits set to the sub-band.

14. The apparatus of claim 9, wherein the bit allocation unit is configured to set the allocated bits to zero when the allocated bits are less than predetermined minimum bits set to the sub-band.

15. The apparatus of claim 9, wherein the bit allocation unit is configured to set the allocated bits to predetermined minimum bits set to the sub-band, when the allocated bits are less than the predetermined minimum bits.

16. The apparatus of claim 9, wherein the bit allocation unit is based on the allocated bits for higher bands.

17. The apparatus of claim 10, wherein the bit allocation unit is based on spectral energy of the sub-band.

18. The apparatus of claim 10, wherein the bit allocation unit is configured to limit the allocated bits, based on predetermined minimum bits set to the sub-band.

19. The apparatus of claim 10, wherein the bit allocation unit is configured to set the allocated bits to zero when the allocated bits are less than predetermined minimum bits set to the sub-band.

20. The apparatus of claim 10, wherein the bit allocation unit is configured to set the allocated bits to predetermined minimum bits set to the sub-band, when the allocated bits are less than the predetermined minimum bits.

21. The apparatus of claim 10, wherein the bit allocation unit is based on the allocated bits for higher bands.

* * * * *